United States Patent [19]

McGugan et al.

[11] Patent Number: 4,892,280

[45] Date of Patent: Jan. 9, 1990

[54] CLAMPING DEVICES FOR USE WITH ELONGATE MEMBERS

[75] Inventors: John D. McGugan; William A. Turner; Robert A. M. Hunt, all of Aberdeen, Scotland

[73] Assignee: Hunting Oilfield Services Limited, Aberdeen, Scotland

[21] Appl. No.: 250,714

[22] Filed: Sep. 29, 1988

[30] Foreign Application Priority Data

Oct. 5, 1987 [GB] United Kingdom ............... 8723352

[51] Int. Cl.⁴ ............................................. A47B 96/00
[52] U.S. Cl. .................................... 248/230; 24/268; 248/316.2
[58] Field of Search ................ 248/230, 231.3, 220.2, 248/222.1, 316.2; 24/268, 19, 25

[56] References Cited

U.S. PATENT DOCUMENTS

| 1,803,508 | 5/1931 | Rossman | 248/230 X |
| 1,808,059 | 6/1931 | Mortenson | 248/230 X |
| 1,863,539 | 6/1932 | Hawley | 248/230 |
| 2,071,823 | 2/1937 | Duncan | 248/230 |
| 4,074,402 | 2/1978 | Taketani | 24/268 |
| 4,563,795 | 1/1986 | Fournier | 24/268 X |
| 4,679,755 | 7/1987 | Marsault et al. | 24/19 X |
| 4,714,229 | 12/1987 | Force et al. | 24/19 X |

FOREIGN PATENT DOCUMENTS

| 602208 | 5/1948 | United Kingdom . |
| 0992116 | 5/1965 | United Kingdom ................ 24/268 |
| 1207590 | 10/1970 | United Kingdom . |
| 1409224 | 10/1975 | United Kingdom . |
| 2018379 | 10/1979 | United Kingdom . |
| 2165581 | 4/1986 | United Kingdom . |

Primary Examiner—Ramon O. Ramirez
Attorney, Agent, or Firm—Watson, Cole, Grindle & Watson

[57] ABSTRACT

A clamping device for clamping on to an elongate member, e.g. for supporting a component on the member or for strengthening the member itself, comprises an annular shell for surrounding the member, the shell being formed by a plurality of generally part annular segments, each segment having generally axially extending edges provided with outwardly projecting ribs, juxtaposed ribs of adjacent segments being engaged by engagement means to hold the segments around the elongate member. The ribs are generally wedge shaped in the axial direction of the shell. The engagement members have grooves for receiving and engaging a pair of juxtaposed ribs, the grooves having an overall shape corresponding to shape of the pair of juxtaposed ribs and are slidable axially along the ribs to draw the ribs and segments together around the elongate member. The inner surface of the shell may have a shape corresponding to that of the elongate member for engagement therewith directly or through a resiliently compressible layer, the clamping force being applied to the shell by engagement of the engagement members with the ribs, or wedge members may be provided between the shell and the elongate member, relative axial movement between the wedge members and the shell producing the required clamping stress in the shell.

19 Claims, 5 Drawing Sheets

CLAMPING DEVICES FOR USE WITH ELONGATE MEMBERS

The present invention relates to a clamping device for clamping on to and around an elongate member, for example for supporting a component on the member or for supporting and/or strengthening the member itself, particularly but not exclusively for use under water in connection with cylindrical members of drilling or oil or gas production assemblies.

According to one aspect of the present invention there is provided a clamping device for clamping onto an elongate member comprising an annular shell for surrounding the cylindrical member and formed by a plurality of generally part annular segments, each segment having generally axially extended edges, each edge being provided with an outwardly projecting rib extending axially therealong, the ribs of adjacent segments being in use juxtaposed, and engagement members for engaging each pair of juxtaposed ribs for holding the segments together around the elongate member, the engagement members being slidable longitudinally of the ribs into full engagement with the respective pairs of juxtaposed ribs.

Advantageously each pair of juxtaposed ribs is generally wedge shaped in the longitudinal direction and each engagement member comprises an elongate member provided with a longitudinal groove which is correspondingly shaped to receive the pair of juxtaposed ribs and to hold the ribs together against the circumferential clamping stress. With this arrangement, as the engagement members are slid axially along the ribs into full engagement therewith, the ribs and associated segments are progressively drawn together around the elongate member. The required clamping stress can be produced in the shell by this movement of the engagement members or using wedge elements positioned between the shell and the elongate member, the shell and wedge elements being relatively axially moved to stress the shell around the elongate member.

Further features and advantages of the present invention will become apparent from the following description of embodiments thereof, given by way of example only, with reference to the accompanying drawings in which.

Figure 1:
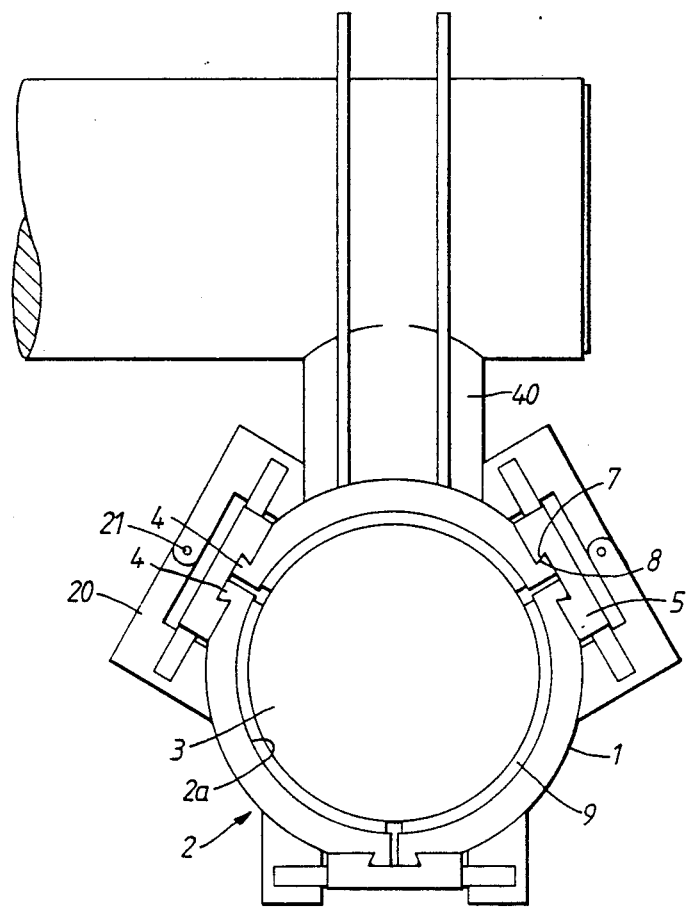
FIG. 1 is an end view of an embodiment of clamping device according to the present invention.
Figure 2:
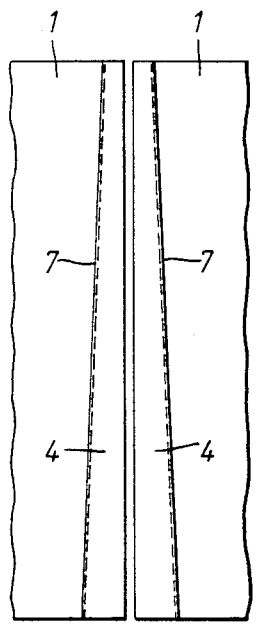
FIG. 2 is a side elevation showing the ribs of two adjacent segments of the shell of the device of FIG. 1.
Figure 3:
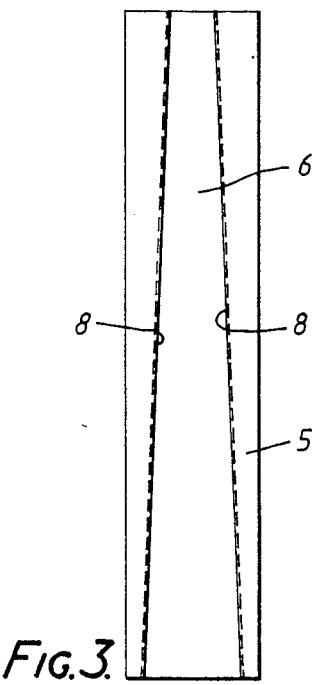
FIG. 3 is an elevation of an engagement member of the embodiment of FIG. 1.

The clamping device shown in FIGS. 1 to 3 comprises a plurality of part generally cylindrical segments 1 having generally axially extending edges which, when the segments are assembled together with their axially extending edges juxtaposed, define a generally cylindrical shell 2 for surrounding and clamping to an elongate generally cylindrical member 3. As shown, the shell comprises three segments 1 but it will be appreciated that it may be divided into two, or more than three, segments depending on the circumstances of use. Additionally, although as shown the segments are for convenience substantially identical, they need not be.

For holding and clamping the segments 1 together around the cylindrical member 3, each axially extending edge of each segment is provided with a generally axially extending rib 4 which projects outwardly from the shell 2. Each pair of juxtaposed ribs 4 is engaged by an elongate engagement member 5 which is provided with a groove 6 corresponding in shape to the overall shape of a pair of juxtaposed ribs 4 and in which the pair of ribs is received, the engagement member being axially slidable along the ribs to fully engage the ribs. Each pair of ribs has oppositely circumferentially directed surfaces 7 which are engaged by corresponding surfaces 8 of the groove 6 to hold the adjacent segments together. The pairs of ribs 4 are also shaped to retain the engagement member 5 against radial outward movement out of engagement with the ribs. As shown, surfaces 7 of a pair of ribs are mutually inclined in the radial direction and serve both as surfaces against which the engagement member bears to hold the segments together and to retain the engagement member against radial outward movement. The angle between surfaces 7 is preferably between about 20° and 90°. The ribs may have other configurations for this purpose. For example, each pair of ribs may define a generally T-shape, the groove 6 in the engagement member 5 being correspondingly T-shaped.

The pairs of ribs 4 and the groove 6 in the engagement member are also arranged so that axial movement of each engagement member along a pair of ribs 4 progressively draws the ribs together and draws the segments together around the cylindrical member.

In this embodiment each pair of surfaces 7 is mutually inclined in the direction of the axis of the shell so that each pair of ribs 4 has an overall wedge shape. In the particular embodiment, this is achieved by progressively increasing the circumferential width of each rib 4 in the axial direction. The groove 6 in the engagement member is correspondingly wedge shaped.

The shell 1 may be designed to be clamped directly on to the member 3. The inner surface 2a of the shell 2 is then cylindrical and corresponds in shape to the surface of member 3. In use the segments are arranged around the member 3 and the engagement members 5 are then pushed axially along the pairs of ribs 4 until the required stress in the segments 1, providing the required clamping force of the segments 1 on the member 3, is achieved. The angle of inclination of the surfaces 7 to the axial direction is determined in dependence on the available force which can be applied axially to the members 5 (the greater the angle the greater the force required to provide a predetermined circumferential stress in the shell 2) and the distance of relative travel of the members 5 and segments 1 to achieve the required stress. The angle is advantageously between about 1.5° and 5°.

To accommodate surface irregularities and some ovality of the cylindrical member 3 with which the clamping device can be used, the segments 1 may be provided on their inner surfaces with a layer 9, as shown in FIG. 1, of resiliently compressible material, e.g. neoprene.

The above-described device may be used for example to support a component, e.g. component 40, on the tubular member 3, the component being fixed to one of the segments 1. It may alternatively be used to reinforce that part of member 3 about which is clamped. For certain types of cylindrical members, such for example as conductor casings, made from sections which are welded together, if the welded join shows signs of deterioration, e.g. a fracture, it may not be essential to renew the weld (which can be very expensive particularly if the join is submerged) but it will be essential to provide some means for relieving the stresses and strains in the join to prevent further deterioration. It may also be useful to relieve stresses and strains in new formed joins. The above-described device may be used for both such purposes.

It will be appreciated that the axial length of the segments 1 is determined in dependence on the purpose of the clamping device.

To assist assembly of the above-described device, all but two juxtaposed edges of the segments may be initially interconnected by temporary hinges 20 (FIG. 2) which are bolted to the segments and are removed in total or their hinge pins 21 are removed when the engagement members have been assembled with the ribs and partially engaged therewith. Additionally, when the device is used on a cylindrical member 3 which is vertical, a landing ring, e.g. ring 17 in FIG. 6, may be used, the ring being first clamped around the member 3 at the level of the lower end of the shell, and the lower ends of the segments are then rested on the ring while they are assembled with the engagement members. The landing ring 17 may for example comprise two half rings which are hinged together and are then bolted around the member 3.

The engagement members 5 may be forced into full engagement with the rings of the segments by a hydraulic cylinder assembly (not shown) which is assembled around the shell and acts between the ends of the engagement members at which their grooves are narrowest and the opposite ends of the segments so that the members are substantially simultaneously engaged with the ribs of the segments.

Figure 4:
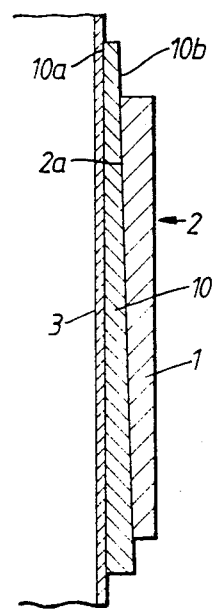
FIGS. 4 and 5 are part axial sections showing modifications of the embodiment of FIG. 1.

To enable use of the clamping device with an even greater range of diameters of member 3, the shell 2, may be adapted to be clamped on to the member 3 through the intermediary of wedge means. Such an arrangement is shown in FIG. 4. In this embodiment, the inner surface $2a$ of the shell 2 is generally frustoconical and a plurality of axially extending, circumferentially spaced wedge elements 10 are provided for insertion between the shell and the member 3. The wedge elements 10 have part cylindrical inner surfaces $10a$ substantially corresponding to the cylinder of member 3, and part frustoconical outer surfaces $10b$ corresponding to the inner surface $2a$ of the shell 1. Each segment 1 is associated with at least one, but possibly two or more, wedge elements 10. It will be appreciated that the end view of an arrangement as shown in FIG. 4 will correspond with the end view shown in FIG. 1 but with the layers 9 replaced by the wedge elements 10.

In use of such a device, the members 5 are initially fully engaged with the ribs 4 but no axial force will be required to enable this. Means may be provided for locking the members 5 axially relative to the ribs 4 in their fully engaged position. The clamping force of the shell 2 on the member 3 is then produced by forcing the wedge elements 10 and shell 2 axially relative to each other to produce a circumferential stress in the shell 2.

For convenience of assembly, the wedge elements 10 may initially be retained relative to their respective segments 1 in a position permitting the segments 1 to be engaged around the member 3 without stress. For example radial bolts may be provided extending through the segments 1 into the wedge elements 5, the bolts being removed when the segments 1 have been assembled around the member 3 and the members 5 fully engaged therewith, but before axial force is applied between the shell 2 and wedge elements 10. The axial force may, as in the embodiment of FIG. 1, be provided using a hydraulic cylinder assembly acting between the shell 2 and the wedge elements 10. Preferably axial force is applied to the wedge elements 10 individually so that, in the fully engaged position of the clamping device, the wedge elements may not all have the same axial position. This enables the clamping device to accommodate a degree of ovality of the cylindrical member 3.

Figure 5:
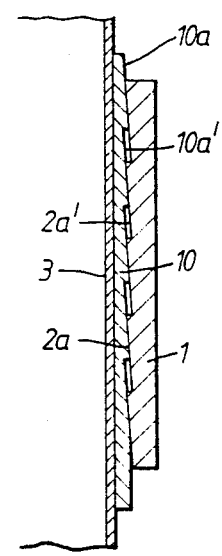

To reduce the extent to which the radial thickness of segments 1 is reduced in the axial direction by the requirement to provide it with a frustoconical inner surface, the outer surfaces $10b$ of the wedge elements 10 and the inner surface $2a$ of the shell 2 may both be stepped and provided with a plurality of axially spaced circumferentially extending substantially identical frustoconical surface portions $10a'$ $2a'$, as shown in FIG. 5. It will be appreciated that, with the embodiment of FIG. 5, the extent of relative axial movement of the shell 2 and wedge elements 10 is limited by the axial extent of the frustoconical surface portions $2a'$, $10a'$.

Where the above described clamping device is to be used to support or strengthen a join between two cylindrical sections of a cylindrical member 3 and the sections may have slightly different diameters or not be exactly axially aligned, the shell 2 may be adapted so that one end portion will clamp directly on to one section of the cylindrical member and the other end portion will clamp against the other section through a plurality of wedge elements similar to those of either of the embodiments of FIGS. 4 and 5.

Figure 6:
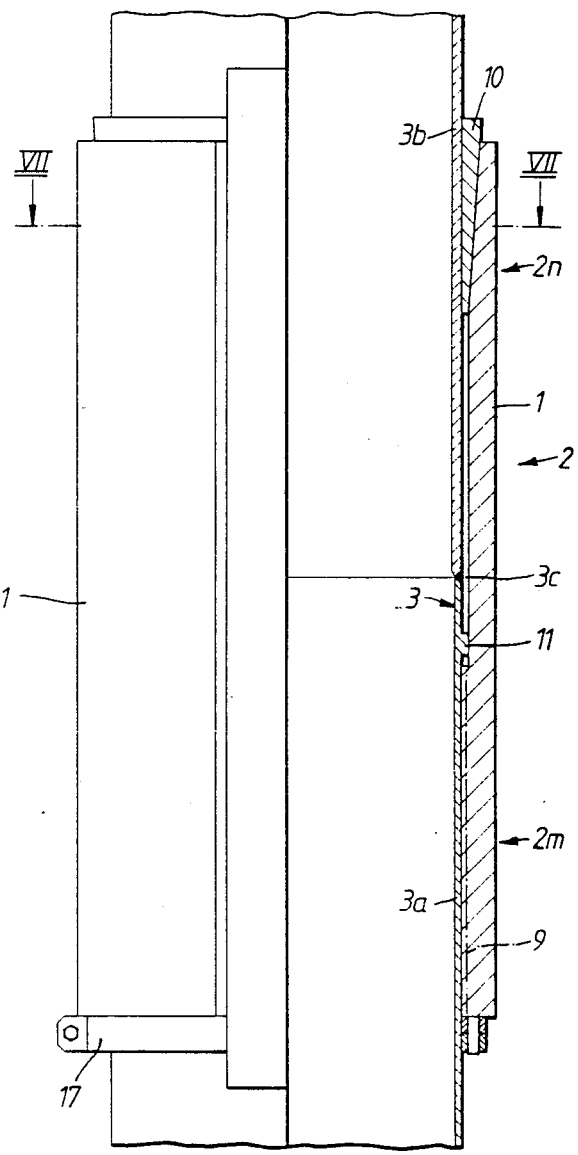
FIG. 6 is a part axial section showing another embodiment according to the present invention.
Figure 7:
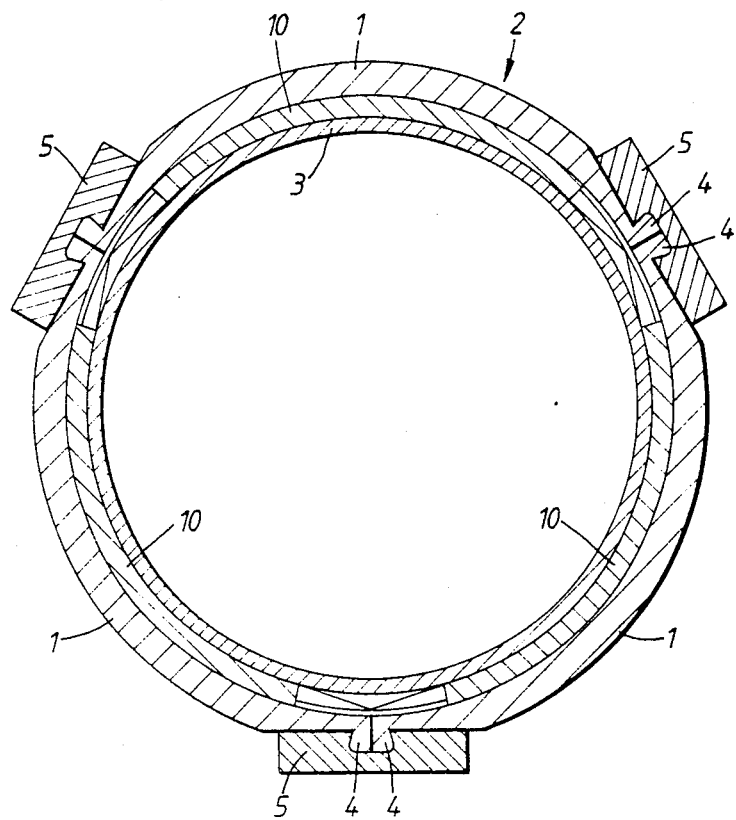
FIG. 7 is a section through FIG. 6 on the line VII—VII of FIG. 6.

Such an arrangement is shown in FIGS. 6 and 7 using wedge elements similar to those of FIG. 4. As shown, the inner surface of end portion $2m$ of the shell 2 is cylindrical with a diameter corresponding to that of section $3a$ of member 3. The other end portion $2n$ of shell 2 has a generally frustoconical inner surface which widen in the direction of the free end of end portion $2n$ and corresponds to the frustoconical outer surfaces of wedge elements 10, whose inner surfaces correspond to the diameter of section $3b$ of member 3. In use, the end portion $2n$ of the shell is clamped around section $3a$ by forcing the engagement members along the ribs to their fully engaged positions. The wedge elements 10 are then forced inwardly of the shell, i.e. using a hydraulic cylinder assembly, to stress end portion $2n$ of the shell. As shown, the inner surface of the shell 2 is stepped to one side of the join $3c$ between the sections $3a$ and $3b$. Between the step and the inner end of the frustoconical portion of the inner surface of the shell, the inner surface is cylindrical with a diameter greater than that of the member 3 to provide a clearance between the inner surface of the shell and the section $3b$ of the member and to accommodate a flange 11 on the section $3a$. In the absence of the flange 11, the step in the inner surface of the shell may be closer to the join $3c$ between the sections and indeed the step may be omitted, the dimensions of the inner surface of the shell progressively increasing across the join to provide the required clearance. Additionally the frustoconical surface portion may extend axially closer to the join than in the embodiment illustrated. The outer surfaces of the wedge element 10 of FIG. 6 may, in a modification, have a configuration corresponding to that of the wedge elements of the embodiment of FIG. 5, the frustoconical surface portion of the inner surface of the shell being correspondingly shaped. For use with a member 3 which is, in use, in tension, the conicity of the frustoconical portion of the inner surface of shell portion 2n may be reversed, the wedge elements then being pulled outwardly of the shell to stress shell portion 2n.

The end portion 2m of the shell 2 of the embodiment of FIGS. 6 and 7 may also be modified so as to accommodate surface irregularities and some ovality of the section 3a by providing the segments 1 in shell portion 2m with a compressible lining 9 as in the embodiment of FIG. 1 and as shown in broken lines in FIG. 6.

Figure 8:
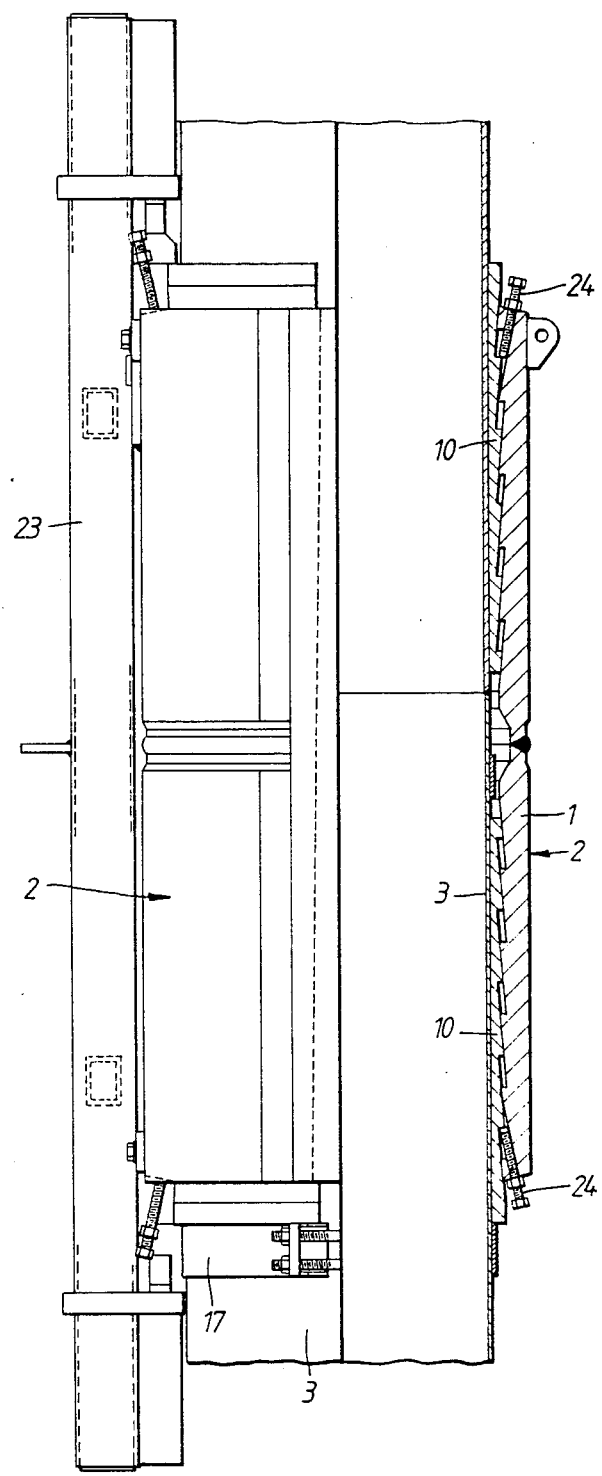
FIG. 8 is a part sectional part elevational view of a further embodiment according to the present invention.

In a further modification of the embodiment of FIGS. 6 and 7, both end portions 2m and 2n of the shell 2 may be designed to clamp on to the cylindrical member 3 through the intermediary of wedge elements 10. Such an arrangement is shown in FIG. 8 in which, in effect, the two portions 2m, 2n of the shell 2 are mirror images, the inner surface of the shell having two frustoconical portions with opposite conicities and both widening towards the respective free ends. As shown the two sets of wedge elements 10 and the corresponding surface portions of the inner surface of the shell 2 have configurations as shown in FIG. 5 but they may equally have configurations as shown in FIG. 4. With this embodiment, when the shell 2 has been assembled about the member 3 and the engagement members 5 fully engage with the ribs 4, both sets of wedge elements 10 are forced axially inwardly to create the required clamping stress in the shell 2. An hydraulic cylinder assembly 23 for this purpose is shown in FIG. 8. The sets of wedge elements may be forced inwardly simultaneously or sequentially and preferably the force is applied to the elements individually.

In this embodiment the wedge elements 10 may be locked in their final positions by bolts 24 threaded through the segments 1 to bear against a step in the surface of the respective wedge element. This feature may also be used in the embodiment of FIG. 5. In a modification of the embodiment of FIG. 8, for use with a member 3 which is in tension, the frustoconical surface portions may be reversed so that they widen inwardly, the sets of wedge elements 10 then being pulled outwardly to stress the shell.

In preferred embodiments of the above described devices for use underwater, the segments of the shell, the engagement members and the wedges, where provided, are made of steel. Additionally, sealing means may be provided to prevent flow of ambient fluid into the shell and/or flow of fluid outwardly of the shell.

While as described above the clamp device is designed for use with generally cylindrical elongate members, it will be appreciated that it is equally applicable to elongate members of other shapes both curved and polygonal.

We claim:

1. A clamping device for clamping onto an elongate member comprising an annular shell for surrounding the elongate member and formed by a plurality of generally part annular segments, each segment having generally axially extending edges, each edge being provided with an outwardly projecting rib extending axially therealong, the ribs of adjacent segments being in use juxtaposed, engagement members for engaging each pair of juxtaposed ribs for holding the segments together around the elongate member, the engagement members being slidable longitudinally of the ribs into full engagement with the respective pairs of juxtaposed ribs, wherein part at least of the inner surface of the shell is frustoconical and wedge means are provided for positioning between the shell and the elongate member to stress said part of the shell to clamp the shell around the elongate member, the wedge means comprising a plurality of axially extending, circumferentially spaced wedge members, each having an inner surface shaped to engage the surface of the elongate member and a part frustoconical outer surface corresponding to the frustoconical inner surface of said shell, said wedge members being axially movable relative to the shell for adjusting the force applied by the shell to the elongate member.

2. A device as claimed in claim 1, wherein each engagement member comprises an elongate member provided with a longitudinal groove shaped to receive the corresponding pair of juxtaposed ribs.

3. A device as claimed in claim 1, wherein each pair of juxtaposed ribs is shaped to retain the engagement members when engaged therewith against radial movement thereof out of disengagement with the ribs.

4. A device as claimed in claim 1, wherein each pair of juxtaposed ribs is shaped so that adjacent segments are progressively drawn together around the elongate member as the engagement members are slid axially along the ribs into full engagement therewith.

5. A device as claimed in claim 1, wherein the width of each rib in the circumferential direction of the shell progressively increases in one longitudinal direction such that each pair of ribs is generally wedge shaped in the longitudinal direction.

6. A device as claimed in claim 1, wherein each pair of juxtaposed ribs provides a pair of oppositely facing circumferentially directed surfaces extending generally axially of the shell and which are engaged by the engagement member.

7. A device as claimed in claim 6, wherein each pair of surfaces are mutually inclined in the axial direction to create a wedge shape therebetween.

8. A device as claimed in claim 7, wherein the said surfaces of each pair of juxtaposed ribs are mutually inclined to a radial direction to create a wedge shape therebetween, and each engagement member comprises an elongate member provided with a longitudinal groove having a shape generally corresponding to the overall shape of a said pair of juxtaposed ribs.

9. A device as claimed in claim 1, wherein the inner surface of a part at least of the shell corresponds generally to the configuration of the surface of the elongate member.

10. A device as claimed in claim 9, wherein the shell is adapted so that in use said part at least of the inner surface of the segments directly engage the elongate member, the engagement members when fully engaged with the ribs holding the segments against the elongate member with the required clamping force.

11. A device as claimed in claim 9, wherein said part at least of the inner surface of each segment is provided with a resiliently compressible layer which is compressed against the elongate member when the shell is clamped round the elongate member by full engagement of the engagement members with the ribs.

12. A device as claimed in claim 1, wherein the outer surface of each wedge member is stepped and comprises a plurality of axially spaced substantially identical part frustoconical surfaces, the said part at least of the inner surface of the shell being correspondingly shaped.

13. A device as claimed in claim 1, wherein substantially the whole of the inner surface of the shell is frustoconical.

14. A device as claimed in claim 1, wherein the one end portion of the inner surface of the shell is shaped to engage the elongate member and the other end portion of the inner surface of the shell is generally frustoconical for clamping against the elongate member through the wedge means.

15. A device as claimed in claim 1, wherein both end portions of the inner surface of the shell are frustoconical, the end portions having opposite conicity, and two sets of wedge means are provided for positioning between both end portions of the inner surface of the shell and the elongate member.

16. A device as claimed in claim 1, adapted for use with a cylindrical elongate member, the shell being generally cylindrical.

17. A device as claimed in claim 1, for supporting a component on the elongate member, the component being fixed to one of the segments.

18. A clamping device for clamping onto an elongate member comprising an annular shell for surrounding the elongate member and formed by a plurality of generally part annular segments, each segment having generally axially extending edges, each edge being provided with an outwardly projecting rib extending axially therealong, the ribs of adjacent segments being in use juxtaposed, engagement members for engaging each pair of juxtaposed ribs for holding the segments together around the elongate member, the engagement members being slidable longitudinally of the ribs into full engagement with the respective pairs of juxtaposed ribs, each pair of juxtaposed ribs being shaped so that adjacent segments are progressively drawn together round the elongate member as the engagement members are slid axially along the ribs into full engagement therewith, wherein part at least of the inner surface of the shell is generally frustoconical and wedge means are provided for positioning between the shell and the elongate member to stress said part at least of the shell to clamp the shell around the elongate member, the wedge means comprising a plurality of axially extending, circumferentially spaced wedge members, each having an inner surface shaped to engage the surface of the elongate member and a part frustoconical outer surface corresponding to and for contacting said frustoconical inner surface of said shell, said wedge members being adjustably positionable axially relative to the shell.

19. A clamping device for clamping onto an elongate member comprising an annular shell for surrounding the elongate member and formed by a plurality of generally part annular segments, each segment having generally axially extending edges, each edge being provided with an outwardly projecting rib extending axially therealong, the ribs of adjacent segments being in use juxtaposed, engagement members for engaging each pair of juxtaposed ribs for holding the segments together around the elongate member, the engagement members being slidable longitudinally of the ribs into full engagement with the respective pairs of juxtaposed ribs, wherein part at least of the inner surface of the shell is generally frustoconical and wedge means are provided for positioning between the shell and the elongate member, the wedge means comprising a plurality of axially extending, circumferentially spaced wedge members, each having an inner surface shaped to engage the surface of the elongate member and a part generally frustoconical outer surface corresponding to and for contacting said frustoconical inner surface of the shell, the outer surface of each wedge member and said frustoconical part of the inner surface of the shell being stepped and comprising a plurality of axially spaced part frustoconical surfaces, the wedge members being adjustably positionable axially relative to the shell for adjusting the clamping force of the shell around the elongate member.

* * * * *